United States Patent
Taki et al.

(10) Patent No.: US 11,847,440 B2
(45) Date of Patent: Dec. 19, 2023

(54) VEHICLE PROGRAM UPDATE MANAGEMENT SYSTEM, REPROGRAMMING TERMINAL, AND VEHICLE PROGRAM UPDATE MANAGEMENT METHOD

(71) Applicant: HONDA MOTOR CO., LTD., Tokyo (JP)

(72) Inventors: Tomoaki Taki, Tokyo (JP); Takeshi Kanda, Tokyo (JP); Junya Ikoma, Tokyo (JP); Yuki Kubo, Tokyo (JP); Yasuhide Aoyama, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 118 days.

(21) Appl. No.: 17/677,594

(22) Filed: Feb. 22, 2022

(65) Prior Publication Data
US 2022/0308858 A1    Sep. 29, 2022

(30) Foreign Application Priority Data

Mar. 26, 2021   (JP) .................... 2021-052603

(51) Int. Cl.
*G06F 8/65*    (2018.01)
*G06F 8/61*    (2018.01)

(52) U.S. Cl.
CPC . *G06F 8/65* (2013.01); *G06F 8/61* (2013.01)

(58) Field of Classification Search
None
See application file for complete search history.

(56) References Cited

U.S. PATENT DOCUMENTS

| | | | |
|---|---|---|---|
| 2018/0018160 A1* | 1/2018 | Teraoka | G06F 8/65 |
| 2018/0152341 A1* | 5/2018 | Maeda | H04L 41/082 |
| 2019/0354364 A1* | 11/2019 | Seki | G06F 8/65 |
| 2021/0141631 A1 | 5/2021 | Harata et al. | |
| 2021/0201599 A1* | 7/2021 | Shionoya | G07C 5/0841 |
| 2021/0389939 A1* | 12/2021 | Kono | H04L 67/125 |

FOREIGN PATENT DOCUMENTS

| | | |
|---|---|---|
| JP | 2000-293364 A | 10/2000 |
| JP | 2005-85054 A | 3/2005 |
| JP | 2007-164603 A | 6/2007 |
| JP | 2017-204227 A | 11/2017 |
| JP | 2020-23314 A | 2/2020 |
| JP | 2020-096321 A | 6/2020 |

OTHER PUBLICATIONS

Japanese Office Action dated Jan. 31, 2023 issued in corresponding Japanese application No. 2021-052603; English machine translation included (13 pages).
Japanese Office Action dated Jul. 11, 2023 issued in corresponding Japanese application No. 2021-052603; English machine translation included (13 pages).

* cited by examiner

*Primary Examiner* — Qing Chen
(74) *Attorney, Agent, or Firm* — Rankin, Hill & Clark LLP (57) ABSTRACT

A vehicle program update management system includes a first server configured to manage a program configuration which is a combination of a plurality of programs, a second server configured to manage a plurality of update programs for the plurality of programs, and a reprogramming terminal which is a device that is wiredly connected to the plurality of control devices to perform information processing for updating the programs.

4 Claims, 5 Drawing Sheets

VEHICLE PROGRAM UPDATE MANAGEMENT SYSTEM, REPROGRAMMING TERMINAL, AND VEHICLE PROGRAM UPDATE MANAGEMENT METHOD

INCORPORATION BY REFERENCE

The present application claims priority under 35 U.S.C. § 119 to Japanese Patent Application No. 2021-052603 filed on Mar. 26, 2021. The content of the application is incorporated herein by reference in its entirety.

BACKGROUND OF THE INVENTION

Field of the Invention

The present invention relates to a vehicle program update management system that manages program updates for an electronic control unit mounted on a vehicle, a reprogramming terminal, and a vehicle program update management method.

Description of the Related Art

In recent years, a movement to make vehicles "connected" is progressing in which a vehicle is connected to a network utilizing a wireless technology. In such "connected" vehicles, comfortable operation such as autonomous driving is expected in the future, whereas a security risk in which a vehicle is attacked through a network is increasing. Many electronic control units are used for a current vehicle, and programs (software) for controlling the electronic control units require updates involving addition or correction of functions. Since the update management for the programs is directly related to the user's safety, the update management is to be subjected to the regulation by the laws based on the international standards. In the regulation, thorough update management for the program is required, and the update history management is required for both cases of when the program is updated through a wired connection and when the program is updated through a wireless connection.

Japanese Patent Laid-Open No. 2020-96321 discloses a technique for determining whether an update device to be connected to a vehicle is authenticated even outside the network range, in order to prevent rewriting of a program by ill-intentioned third parties. However, if there is any possibility that a program or a rewriting command of the program is stolen from the update device and altered even when the update device is authenticated, it is difficult to protect the security of a vehicle. The program for the control device of the vehicle has been updated conventionally and uniformly by distributing, to a vendor or a dealer that performs update work of the program, a recording medium such as a compact disc read only memory (CD-ROM) in which an update program is recorded, but in the case where each vehicle performs program update using a wireless connection, there occurs a difference in program update history for a plurality of control devices of each vehicle, which is unsuitable for a uniform program update.

The present invention is made in the light of the above-described background, and has an object to provide a vehicle program update management device that manages program update for a plurality of control devices mounted on a vehicle, a reprogramming terminal, and a program update management method.

SUMMARY OF THE INVENTION

An inventive aspect to achieve the object described above provides a vehicle program update management system that performs update management for a plurality of programs stored in and executed by each of a plurality of control devices mounted on a vehicle, the vehicle program update management system including a first server configured to manage a program configuration which is a combination of the plurality of programs, a second server configured to manage a plurality of update programs for the plurality of programs, and a reprogramming terminal which is a device that is wiredly connected to the plurality of control devices to perform information processing for updating the programs, wherein the reprogramming terminal includes an update information acquisition unit configured to acquire, from the vehicle, update information about the plurality of programs installed into each of the plurality of control devices mounted on the vehicle, the first server includes a determination unit configured to determine the program configuration necessary for the vehicle based on the update information, a reprogramming information generation unit configured to generate reprogramming information which is information about the update programs necessary for the vehicle, based on the determination, and an install command generation unit configured to generate install command information which is information about a command for installing the update programs into the plurality of control devices, and the reprogramming terminal further includes an update program acquisition unit configured to acquire the plurality of update programs from the second server based on the reprogramming information, a command acquisition unit configured to acquire the install command information, and a writing unit configured to write the acquired plurality of update programs into each of the plurality of control devices based on the install command information.

The above-described vehicle program update management system may have a configuration in which at least one of the program configuration, the update program, and the install command information is stored in a volatile storage unit included in the reprogramming terminal and is not stored in a nonvolatile storage unit included in the reprogramming terminal.

Another inventive aspect to achieve the object described above provides a reprogramming terminal which is a device that is wiredly connected to a plurality of control devices mounted on a vehicle to perform information processing for updating a plurality of programs stored in and executed by each of the plurality of control devices, the reprogramming terminal including an update information acquisition unit configured to acquire update information about the plurality of programs installed into each of the plurality of control devices, an update program acquisition unit configured to acquire a plurality of update programs from a second server that manages the plurality of update programs for the plurality of programs, a command acquisition unit configured to acquire, from a first server, install command information about a command for installing the update programs into the plurality of control devices, the first server managing a program configuration which is a combination of the plurality of programs, and a writing unit configured to write the acquired plurality of update programs into each of the plurality of control devices based on the install command information.

Another inventive aspect to achieve the object described above provides a vehicle program update management method that performs update management for a plurality of programs stored in and executed by each of a plurality of control devices mounted on a vehicle, the method including a first step of managing a program configuration which is a combination of the plurality of programs, a second step of managing a plurality of update programs for the plurality of programs, and a reprogramming step of causing a device wiredly connected to the plurality of control devices to perform information processing for updating the programs, wherein the reprogramming step includes an update information acquisition step of acquiring, from the vehicle, update information about the plurality of programs installed into each of the plurality of control devices mounted on the vehicle, the first step includes a determination step of determining the program configuration necessary for the vehicle based on the update information, a reprogramming information generation step of generating reprogramming information which is information about the update programs necessary for the vehicle, based on the determination, and an install command generation step of generating install command information which is information about a command for installing the update programs into the plurality of control devices, and the reprogramming step further includes an update program acquisition step of acquiring the plurality of update programs based on the reprogramming information, a command acquisition step of acquiring the install command information, and a writing step of writing the acquired plurality of update programs into each of the plurality of control devices based on the install command information.

In an update terminal in a dealer or a maintenance shop that performs update work of programs in the vehicle control device through a wired connection, it is not necessary to store the update programs and the install command in the nonvolatile recording medium. This can reduce the security risks such as leakage of the update programs and install command, the reverse engineering, and the like. This produces an advantageous effect that the latest install command can be easily developed without changing the software for updating the update terminal on the market, whereby the update work can be accurately performed.

DETAILED DESCRIPTION OF THE PREFERRED EMBODIMENTS

Hereinafter, embodiments will be described in detail with reference to the drawings. However, the detailed description more than necessary may be omitted. For example, detailed description of well-known matters and redundant description on substantially the same configuration may be omitted. This is to avoid an unnecessary redundancy in the following description and to facilitate understanding by those skilled in the art.

Note that the accompanying drawings and the following description are provided to enable those skilled in the art to fully understand the present disclosure and are not intended to limit subject matters of claims.

Figure 1:
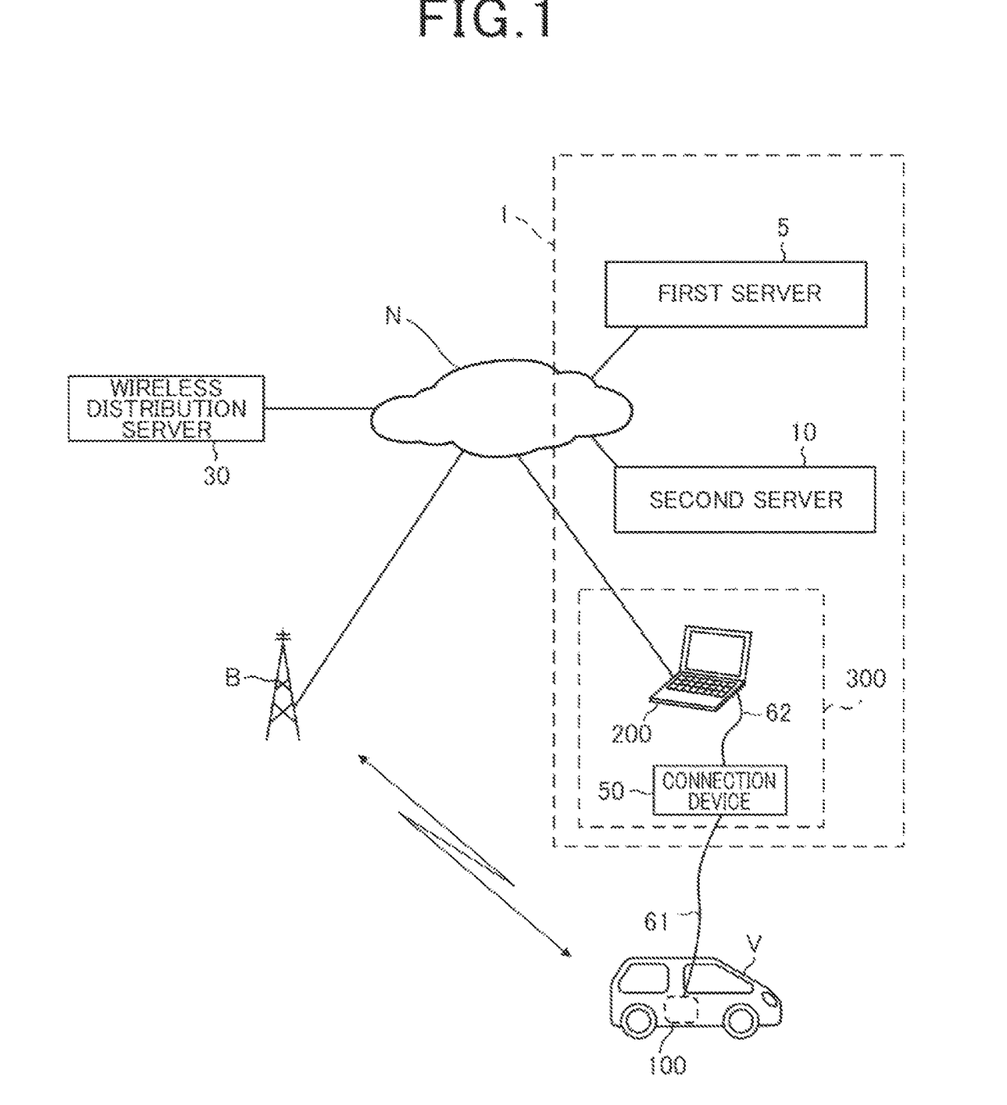
FIG. 1 is a diagram illustrating program update in a vehicle.

1-1. Configurations of Vehicle Program Update Management System According to First Embodiment FIG. 1 is a diagram illustrating program update in a vehicle V. In the case where the vehicle V supports program update through wireless communication, that is, in the case where a program for a control device can be updated through over the air (OTA), an update program is distributed from a wireless distributor server 30 to the vehicle V through a network N and a base station B, and a program is updated. At this time, an update history of the program is managed by a first server 5 in association with a vehicle identification number of the vehicle V.

As used herein, the term "vehicle" is referred to as a moving body such as an automobile or a motorcycle. The moving body may have a drive train including an internal combustion engine using a combustible fuel or may be driven by the other energy sources such as electric energy stored in a battery and hydrogen energy.

A vehicle program update management system 1 according to the present embodiment is a vehicle program update management system that performs update management for a plurality of programs stored in and executed by each of a plurality of vehicle control units mounted on the vehicle V, the vehicle program update management system 1 including the first server 5 configured to manage a program configuration which is a combination of the plurality of programs, a second server 10 configured to manage a plurality of update programs for the plurality of programs, and a reprogramming terminal 300 which is a device that is wiredly connected to the plurality of control devices to perform information processing for updating the programs. The reprogramming terminal 300 includes a maintenance PC (personal computer) 200 and a connection device 50. The connection device 50 may be a vehicle control interface (VCI: on-board fault diagnosis device). Each of the first server 5 and the second server 10 is an information processing device that processes information, provides information, and stores information, and specifically, may be a computer. The first server 5, the second server 10, and the reprogramming terminal 300 exchange information with one another through the network N.

In a dealer or a maintenance shop of the vehicle, the program is updated through a wired connection. Also in this case, the update history of the program is managed by the first server 5. The maintenance PC 200 and the connection device 50 are connected to each other through wired connection means, specifically through a cable 62, and the connection device 50 and a vehicle control device 100 are connected to each other through the wired connection means, specifically through a cable 61. Specifically, the cable used for the wired connection may be, for example, a USB cable. Of course, the cable may include an on-board diagnostic (OBD) connector generally used when a vehicle and an on-board fault diagnosis device are connected to each other.

Figure 2:
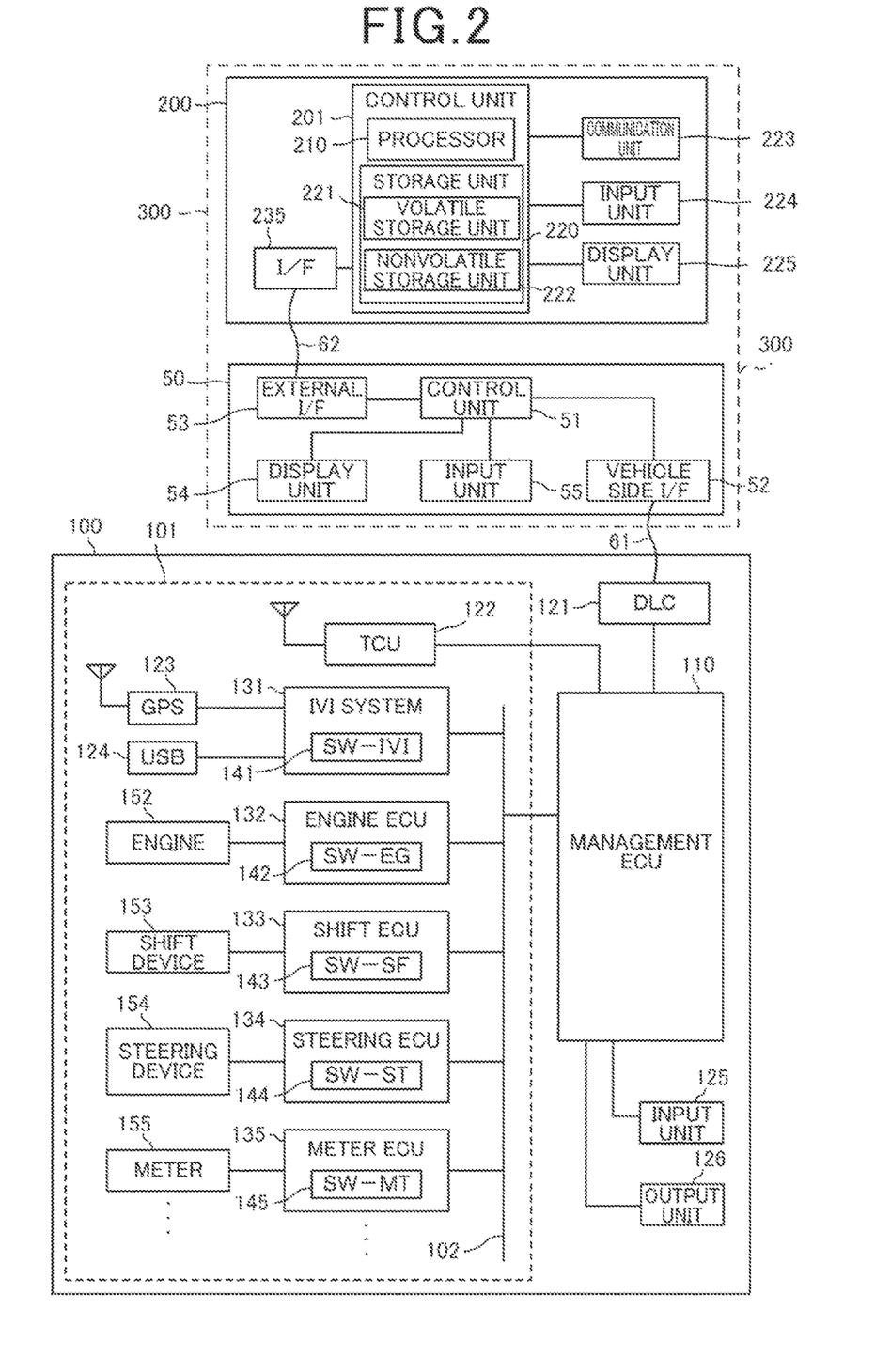
FIG. 2 is a configuration diagram including a reprogramming terminal and a control device of a vehicle.

FIG. 2 is a configuration diagram including the reprogramming terminal 300 included in the vehicle program update management system 1 according to the first embodiment and the vehicle control device 100 of the vehicle V. The reprogramming terminal 300 includes the maintenance PC 200 and the connection device 50. The maintenance PC 200 is an information processing device including a communication unit 223 configured to communicate with the first server 5 and the like through the network N, an input unit 224 to which information is to be input, a display unit 225 on which information is to be displayed using an image or the like, a control unit 201 configured to control the entire maintenance PC 200, and an interface 235 for transmitting and receiving information to and from the connection device 50. The control device 201 includes a processor 210 configured to perform information processing and a storage unit 220 configured to store information. The storage unit 220 includes a volatile storage unit 221 in which memory is lost when power supply is interrupted, and a nonvolatile storage unit 222 in which memory is stored even when power supply is stopped. The processor 210 is, for example, a central processing unit (CPU), and the volatile storage unit 221 is, for example, a random access memory (RAM). The nonvolatile storage unit 222 may be, for example, a read only memory (ROM), a hard disk drive (HDD) or a solid state drive (SSD).

The connection device 50 is provided between the reprogramming terminal 300 and the vehicle control device 100, and includes a control unit 51 configured to perform control, an input unit 55 to which information is to be input, a display unit 54 from which information is to be output, an external interface 53 which is an interface for transmitting and receiving information to and from the maintenance PC 200, and a vehicle side interface 52 for transmitting and receiving information to and from the vehicle control device 100. The connection device 50 may be a vehicle control interface (VCI: on-board fault diagnosis device).

The vehicle control device 100 includes a data link coupler (DLC) 121 which is a connection connector to be connected with the connection device 50 through the cable 61, a management ECU 110 configured to control individual electronic control units (ECUs) which are information processing devices configured to control respective devices included in the vehicle V, an input unit 125 to which information is to be input, and an output unit 126 from which information is to be output. The input unit 125 may be a touch panel in an on-board in-vehicle infotainment (IVI) system. The output unit 126 may be an image display device included in the IVI or an image display device provided in a meter portion. The output unit 126 may be provided in an instrument panel of a driver's seat, for example. Specifically, the output unit 126 is configured as a so-called multi information display (MID) incorporated in a meter panel. The output unit 126 may include a speaker configured to output voice. Alternatively, the output unit 126 may include a hazard lamp.

An on-board device 101 includes a plurality of devices mounted on the vehicle, and electronic control units (ECUs) configured to control the respective devices. The on-board device 101 may include, for example, a telematics control unit (TCU) 122 for performing wireless communication as a device. The on-board device 101 may include an in-vehicle infotainment (IVI) system 131 configured to provide information to an occupant of the vehicle, an engine ECU 132 configured to control an engine 152, a shift ECU 133 configured to control a shift device 153, a steering ECU 134 configured to control a steering device 154, and a meter ECU 135 configured to control a meter 155. Each ECU is connected to the management ECU 110 through a bus 102, to transmit or receive information. Here, the engine 152 means not only a drive train including an internal combustion engine but also may be a motor electrically driven.

The IVI system 131 implements its function by executing software (program) SW-IVI 141, the engine ECU 132 implements its function by executing software SW-EG 142, the shift ECU 133 implements its function by executing software SW-SF 143, the steering ECU 134 implements its function by executing software SW-ST 144, and the meter ECU 135 implements its function by executing software SW-MT 145. In each software, a program is updated by the vehicle program update management system 1 through the wired connection using the cable 61.

Each ECU is a computer including, specifically, a processor such as a CPU, and a memory such as a ROM and a solid state drive (SSD) into which executing programs are written, and a RAM configured to temporarily store data for controlling a device. Specifically, the programs received from the second server 10 through the maintenance PC 200 are executed by the ECUs which are computers, whereby the devices included in the on-board device 101 are controlled. Instead of or in addition to the above-described ECUs, all or some of the above-described ECUs may be each configured of hardware including one or more electronic circuit components. Detailed operations of the vehicle program update management system 1 will be described with reference to FIG. 5, which will be described later.

Figure 3:
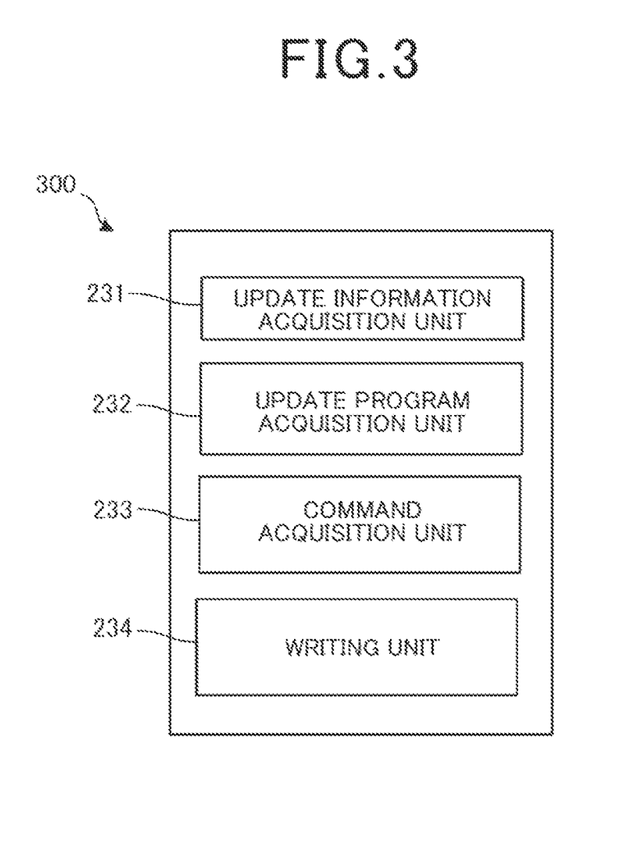
FIG. 3 is a functional block diagram of the reprogramming terminal.

FIG. 3 is a functional block diagram of the reprogramming terminal 300. The reprogramming terminal 300 is a computer that is wiredly connected to the plurality of control devices (ECUs) mounted on the vehicle V to perform information processing for updating a plurality of programs stored in and executed by each of the plurality of control devices. The reprogramming terminal 300 includes an update information acquisition unit 231 configured to acquire update information about a plurality of programs installed into each of a plurality of control devices, an update program acquisition unit 232 configured to acquire a plurality of update programs from the second server 10 that manages the plurality of update programs for the plurality of programs, a command acquisition unit 233 configured to acquire install command information about a command for installing the update programs from the first server 5 into the plurality of control devices, and a writing unit 234 configured to write the acquired plurality of update programs into each of the plurality of control devices based on the install command information.

Figure 4:
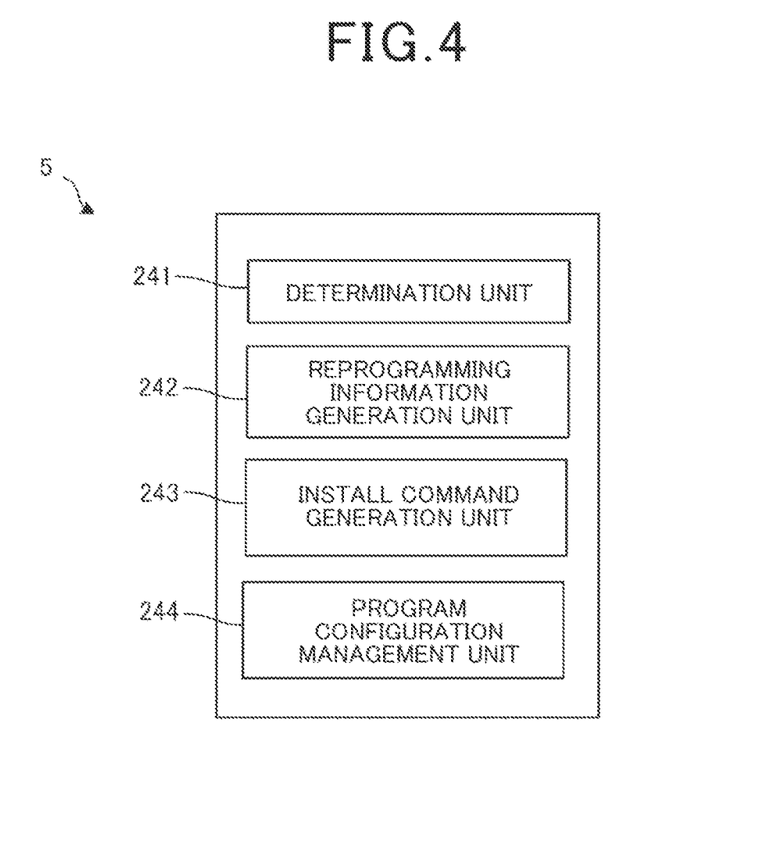
FIG. 4 is a functional block diagram of a first server.

FIG. 4 is a functional block diagram of the first server 5. The first server 5 is a computer configured to manage a program configuration which is a combination of a plurality of programs for executing the function of each control device (ECU) in the vehicle control device 100. Specifically, the first server 5 manages a version of each program, to provide an optimum program configuration for each vehicle V. Note that the program configuration may be associated with a vehicle identification number of each vehicle V. Specifically, the first server 5 includes a program configuration management unit 244 configured to manage a history of a program configuration installed into each ECU in the vehicle control device 100 to bring the program configuration into a state conforming to the laws. At this time, it is desirable that the first server 5 acquires, from the wireless distribution server 30, the information about the program configuration of each vehicle, the program configuration being updated through the OTA.

The first server 5 acquires update information about the programs of the vehicle V, the update information being acquired from the reprogramming terminal 300. The first server 5 includes a determination unit 241 configured to perform a determination as to the program configuration necessary for each vehicle V, based on the update information, a reprogramming information generation unit 242 configured to generate reprogramming information based on the determination, the reprogramming information being information about the update programs necessary for the vehicle, and an install command generation unit 243 configured to generate install command information which is information about a command for installing the update programs into the plurality of control devices.

Note that the first server 5 is an information processing device or computer including a processor configured to perform information processing, and a storage unit configured to store information, and the first server 5 is connected to the wireless distributor server 30, the second server 10, and the reprogramming terminal 300 through the network N to transmit and receive the information. The second server 10 is also a similar information processing device or computer. The second server 10 is a computer configured to store and manage a plurality of update programs for the plurality of programs for executing functions of the control devices (ECUs) included in the on-board device 101. Operations of the first server 5, the second server 10, and the reprogramming terminal 300 in the vehicle program update management system 1 will be described in detail with reference to FIG. 5, which will be described later.

1-2. Operations of Vehicle Program Update Management System

Figure 5:
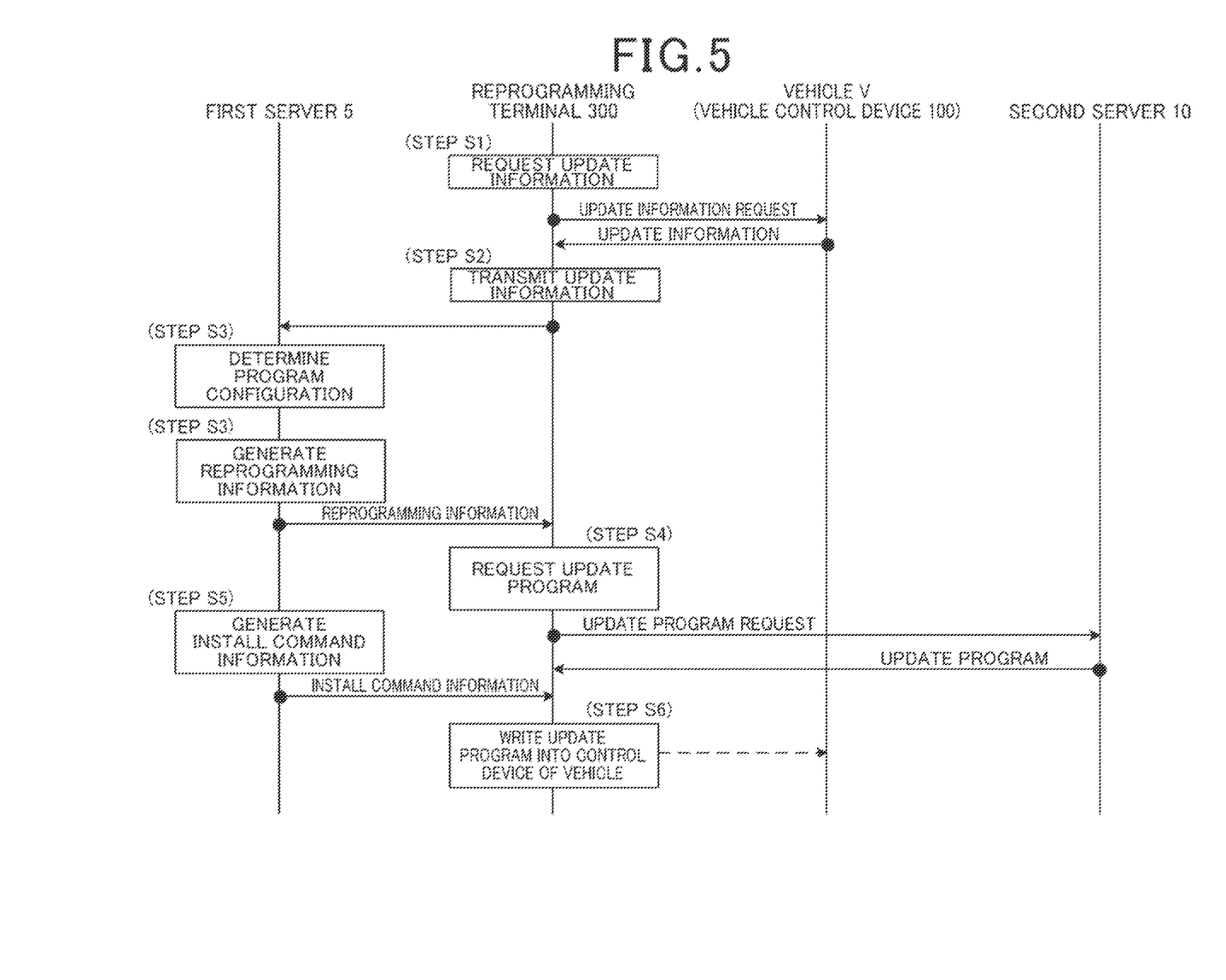
FIG. 5 is a flowchart of vehicle program update management.

FIG. 5 is a flowchart of program update management by the vehicle program update management system 1 according to the first embodiment.

In the case where a person who performs update work of programs issues an instruction to perform program update from the input unit 224 or the input unit 55 in the reprogramming terminal 300, the reprogramming terminal 300 issues an update information request to the vehicle control device 100 of the vehicle V, to make a request to transmit the update information about the plurality of programs installed into each of the control devices (step S1). The vehicle control device 100 that has received the update information request transmits the update information about each program to the reprogramming terminal 300. Then, the reprogramming terminal 300 transmits the acquired update information to the first server 5 (step S2). The first server 5 manages the acquired update information in association with the vehicle identification number in the program configuration management unit 244. Specifically, the first server 5 stores the update history of the programs.

Next, in the first server 5, the determination unit 241 performs the determination as to the program configuration of programs to be updated, the program configuration being necessary for the vehicle V. Then, the reprogramming information generation unit 242 generates reprogramming information based on the determination, the reprogramming information being information about the update programs necessary for the vehicle V (step S3). Specifically, the vehicle V may generate a list of update programs necessary for program update. Next, the first server 5 transmits the reprogramming information to the reprogramming terminal 300. The reprogramming terminal 300 that has acquired the reprogramming information issues an update program request to the second server 10 based on the reprogramming information (step S4). The second server 10 transmits, to the reprogramming terminal 300, the update programs in response to the update program request of the reprogramming terminal 300.

In the first server 5, the install command generation unit 243 generates install command information which is information about a command for installing the update programs into the plurality of control devices of the vehicle V (step S5). Then, the first server 5 transmits the install command information to the reprogramming terminal 300. In the reprogramming terminal 300, the update program acquisition unit 232 acquires the update programs. In addition, in the reprogramming terminal 300, the command acquisition unit 233 acquires the install command information. Then, in the reprogramming terminal 300, the writing unit 234 writes the update programs into each control device of the vehicle control device 100, based on the install command information.

At this time, the reprogramming terminal 300 stores the install command information and the update programs in the volatile storage unit 221, but does not store them in the nonvolatile storage unit 222. Through the above-described operations, the reprogramming terminal 300 implements the program update for the vehicle control device 100 in the vehicle V.

2-1. Configuration of Reprogramming Terminal According to Second Embodiment

A reprogramming terminal 300 according to a second embodiment is a device that is wiredly connected to a plurality of control devices (ECUs) mounted on a vehicle V to perform information processing for updating a plurality of programs stored in and executed by each of the plurality of control devices. The reprogramming terminal 300 includes an update information acquisition unit 231 configured to acquire update information about a plurality of programs installed into each of the plurality of control devices, an update program acquisition unit 232 configured to acquire a plurality of update programs from a second server 10 that manages the plurality of update programs for the plurality of programs, a command acquisition unit 233 configured to acquire install command information about a command for installing the update programs from a first server into the plurality of control devices, and a writing unit 234 configured to write the acquired plurality of update programs into each of the plurality of control devices based on the install command information. A physical configuration of the reprogramming terminal 300 is similar to a configuration of the reprogramming terminal 300 included in the vehicle program update management system 1 according to the first embodiment, and hence detailed description is omitted (see FIG. 2).

2-2. Operations of Reprogramming Terminal

Operations of the reprogramming terminal 300 according to the second embodiment are similar to the operations of the reprogramming terminal 300 included in the vehicle program update management system 1 according to the first embodiment (see FIG. 5), and hence detailed description is omitted.

3. Program Update Management Method According to Third Embodiment

A program update management method according to a third embodiment is a vehicle program update management method that performs update management for a plurality of programs stored in and executed by each of a plurality of control devices mounted on a vehicle V, the method including a first step of managing a program configuration which is a combination of the plurality of programs, a second step of managing a plurality of update programs for the plurality of programs, and a reprogramming step of causing a device wiredly connected to the plurality of control devices to perform information processing for updating the programs, wherein the reprogramming step includes an update information acquisition step of acquiring, from the vehicle, update information about the plurality of programs installed into each of the plurality of control devices mounted on the vehicle, the first step includes a determination step of determining the program configuration necessary for the vehicle based on the update information, a reprogramming information generation step of generating reprogramming information which is information about the update programs necessary for the vehicle, based on the determination, and an install command generation step of generating install command information which is information about a command for installing the update programs into the plurality of control devices, and the reprogramming step further includes an update program acquisition step of acquiring the plurality of update programs based on the reprogramming information, a command acquisition step of acquiring the install command information, and a writing step of writing the acquired plurality of update programs into each of the plurality of control devices based on the install command information.

4. Other Embodiments

In the above-described embodiments, an example has been described in which installation of the update programs on the individual control devices (ECUs) is performed by the writing unit 234 of the reprogramming terminal 300, but the installation may be performed by the first server 5. At this time, it is also conceivable that an operation of acquiring the update programs from the second server 10 is performed by the first server 5. As another modification, the management ECU 110 of the vehicle control device 100 may acquire and write the update programs. In this case, the reprogramming terminal 300 may simply transmit and receive the information without storing the install command information and the update programs.

5. Configurations Supported by Above-Described Embodiments

The above-described embodiments support the following configurations.

(Configuration 1) A vehicle program update management system 1 that performs update management for a plurality of programs stored in and executed by each of a plurality of control devices mounted on a vehicle, the vehicle program update management system including a first server 5 configured to manage a program configuration which is a combination of the plurality of programs, a second server 10 configured to manage a plurality of update programs for the plurality of programs, and a reprogramming terminal 300 that is wiredly connected to the plurality of control devices to perform information processing for updating the programs, wherein the reprogramming terminal 300 includes an update information acquisition unit 231 configured to acquire, from the vehicle V, update information about the plurality of programs installed into each of the plurality of control devices mounted on the vehicle V, the first server 5 includes a determination unit 241 configured to determine the program configuration necessary for the vehicle based on the update information, a reprogramming information generation unit 242 configured to generate reprogramming information which is information about the update programs necessary for the vehicle, based on the determination, and an install command generation unit 243 configured to generate install command information which is information about a command for installing the update programs into the plurality of control devices, and the reprogramming terminal 300 further includes an update program acquisition unit 232 configured to acquire the plurality of update programs from the second server 10 based on the reprogramming information, a command acquisition unit 233 configured to acquire the install command information, and a writing unit 234 configured to write the acquired plurality of update programs into each of the plurality of control devices based on the install command information.

According to the vehicle program update management system according to configuration 1, all of writing software conventionally stored or installed in a PC for performing update work and programs for generating a writing command are arranged in the external server, whereby the risks such as reverse engineering and analysis can be reduced. This makes it unnecessary to perform work of updating the software for updating the programs on the market, whereby the latest update command can be applied as necessary. Furthermore, the program update history for each vehicle can be properly managed.

(Configuration 2) The vehicle program update management system according to configuration 1, wherein at least one of the program configuration, the update program, and the install command information is stored in a volatile storage unit 221 included in the reprogramming terminal 300 and is not stored in a nonvolatile storage unit 222 included in the reprogramming terminal 300.

According to the vehicle program update management system of configuration 2, the programs and command can be written into the control devices of the vehicle as in-memory processing on the volatile memory. The programs and command information are not stored on the nonvolatile recording medium such as HDD and SDD on the market, which makes it possible to reduce the risks of leakage of confidential information.

(Configuration 3) A reprogramming terminal which is a device that is wiredly connected to a plurality of control devices mounted on a vehicle to perform information processing for updating a plurality of programs stored in and executed by each of the plurality of control devices, the reprogramming terminal including an update information acquisition unit 231 configured to acquire update information about the plurality of programs installed into each of the plurality of control devices, an update program acquisition unit 232 configured to acquire a plurality of update programs from a second server 10 that manages the plurality of update programs for the plurality of programs, a command acquisition unit 233 configured to acquire, from a first server 5, install command information about a command for installing the update programs into the plurality of control devices, the first server 5 managing a program configuration which is a combination of the plurality of programs, and a writing unit 234 configured to write the acquired plurality of update programs into each of the plurality of control devices based on the install command information.

According to the reprogramming terminal according to configuration 3, all of writing software conventionally stored or installed in a PC for performing update work and programs for generating a writing command are arranged in the external server, whereby the risks such as reverse engineering and analysis can be reduced. This makes it unnecessary to perform work of updating the software for updating the programs on the market, whereby the latest update command can be applied as necessary. Furthermore, the program update history for each vehicle can be properly managed.

(Configuration 4) A vehicle program update management method that performs update management for a plurality of programs stored in and executed by each of a plurality of control devices mounted on a vehicle, the method including a first step of managing a program configuration which is a combination of the plurality of programs, a second step of managing a plurality of update programs for the plurality of programs, and a reprogramming step of causing a device wiredly connected to the plurality of control devices to perform information processing for updating the programs, wherein the reprogramming step includes an update information acquisition step of acquiring, from the vehicle, update information about the plurality of programs installed into each of the plurality of control devices mounted on the vehicle, the first step includes a determination step of determining the program configuration necessary for the vehicle based on the update information, a reprogramming information generation step of generating reprogramming information which is information about the update programs necessary for the vehicle, based on the determination, and an install command generation step of generating install command information which is information about a command for installing the update programs into the plurality of control devices, and the reprogramming step further includes an update program acquisition step of acquiring the plurality of update programs based on the reprogramming information, a command acquisition step of acquiring the install command information, and a writing step of writing the acquired plurality of update programs into each of the plurality of control devices based on the install command information.

According to the vehicle program update management method according to configuration 4, all of writing software conventionally stored or installed in a PC for performing update work and programs for generating a writing command are arranged in the external server, whereby the risks such as reverse engineering and analysis can be reduced. This makes it unnecessary to perform work of updating the software for updating the programs on the market, whereby the latest update command can be applied as necessary. Furthermore, the program update history for each vehicle can be properly managed.

The embodiments have been described as exemplifications of the techniques disclosed in the present application. However, the techniques in the present disclosure are not limited thereto, and are also applicable to embodiments in which modifications, replacements, additions, omissions and the like are made. Additionally, the constituent elements described in the above-described embodiments can be combined to provide a new embodiment.

For example, step units of control operations illustrated in FIG. 5 are classified according to main processing contents to facilitate the understanding of operation of each unit of the vehicle program update management system 1 and the present invention is never limited by the way how to divide the processing units or the names. The step units of operation may be divided into still more step units according to the processing contents. The step units of operation may be divided such that one step unit includes still more processes. The order of steps may be switched around as appropriate without departing from the sprit and scope of the present invention.

REFERENCE SIGNS LIST

1 Vehicle program update management system
5 First server
10 Second server
30 Wireless distribution server
50 Connection device
51 Control unit
52 Vehicle side interface
53 External interface
54 Display unit
55 Input unit
61 Cable
62 Cable
100 Vehicle control device
101 On-board device
102 Bus
110 Management ECU
121 DLC
122 TCU
123 GPS unit
124 USB connector
125 Input unit
126 Output unit
131 IVI system
133 Shift ECU
134 Steering ECU
135 Meter ECU
141 SW-IVI
142 SW-EG
143 SW-SF
144 SW-ST
145 SW-MT
152 Engine
153 Shift device
154 Steering device
155 Meter
200 Maintenance PC
201 Control unit
210 Processor
220 Storage unit
221 Volatile storage unit
222 Nonvolatile storage unit
223 Communication unit
224 Input unit
225 Display unit
231 Update information acquisition unit
232 Update program acquisition unit
233 Command acquisition unit
234 Writing unit
235 Interface
241 Determination unit
242 Reprogramming information generation unit
243 Install command generation unit
244 Program configuration management unit
300 Reprogramming terminal
B Base station
V Vehicle
N Communication network

What is claimed is:

1. A vehicle program update management system that performs update management for a plurality of programs stored in and executed by each of a plurality of electronic control units (ECUs) mounted on a vehicle, each of the plurality of ECUs being provided with an ECU processor and an ECU memory, the vehicle program update management system comprising:

a first server configured to manage a program configuration which is a combination of the plurality of programs;
a second server configured to manage a plurality of update programs for the plurality of programs; and
a reprogramming terminal which is a device that is wiredly connected to the plurality of ECUs to perform information processing for updating the plurality of programs,
wherein the reprogramming terminal includes:
 a terminal processor configured to acquire, from the vehicle, update information about the plurality of programs installed into each of the plurality of ECUs mounted on the vehicle,
the first server includes:
 a first server processor configured to:
  determine the program configuration necessary for the vehicle based on the update information;
  generate reprogramming information which is information about the plurality of update programs necessary for the vehicle, based on the determination; and
  generate install command information which is information about a command for installing the plurality of update programs into the plurality of ECUs, and
 the terminal processor of the reprogramming terminal is further configured to:
  acquire the plurality of update programs from the second server based on the reprogramming information;
  acquire the install command information; and
  write the acquired plurality of update programs into each of the plurality of ECUs based on the install command information.

2. The vehicle program update management system according to claim 1, wherein:
 at least one of the program configuration, the update program, and the install command information is stored in a volatile storage unit included in the reprogramming terminal and is not stored in a nonvolatile storage unit included in the reprogramming terminal.

3. A reprogramming terminal which is a device that is wiredly connected to a plurality of electronic control units (ECUs mounted on a vehicle, each of the plurality of ECUs being provided with an ECU processor and an ECU memory, to perform information processing for updating a plurality of programs stored in and executed by each of the plurality of ECUs, the reprogramming terminal comprising:
 a terminal processor configured to:
  acquire update information about the plurality of programs installed into each of the plurality of ECUs;
  acquire a plurality of update programs from a second server that manages the plurality of update programs for the plurality of programs;
  acquire, from a first server, install command information about a command for installing the plurality of update programs into the plurality of ECUs, wherein the first server manages a program configuration which is a combination of the plurality of programs; and
  write the acquired plurality of update programs into each of the plurality of ECUs based on the install command information.

4. A vehicle program update management method that performs update management for a plurality of programs stored in and executed by each of a plurality of electronic control units (ECUs mounted on a vehicle, each of the plurality of ECUs provided with an ECU processor and an ECU memory, the vehicle program update management method comprising:
 a first step of managing a program configuration which is a combination of the plurality of programs;
 a second step of managing a plurality of update programs for the plurality of programs; and
 a reprogramming step of causing a device wiredly connected to the plurality of ECUs to perform information processing for updating the plurality of programs,
 wherein the reprogramming step includes:
  an update information acquisition step of acquiring, from the vehicle, update information about the plurality of programs installed into each of the plurality of ECUs mounted on the vehicle,
 wherein the first step includes:
  a determination step of determining the program configuration necessary for the vehicle based on the update information;
  a reprogramming information generation step of generating reprogramming information which is information about the plurality of update programs necessary for the vehicle, based on the determination; and
  an install command generation step of generating install command information which is information about a command for installing the plurality of update programs into the plurality of ECUs, and
 wherein the reprogramming step further includes:
  an update program acquisition step of acquiring the plurality of update programs based on the reprogramming information;
  a command acquisition step of acquiring the install command information; and
  a writing step of writing the acquired plurality of update programs into each of the plurality of ECUs based on the install command information.

* * * * *